United States Patent [19]

Baugh

[11] Patent Number: 4,863,314
[45] Date of Patent: Sep. 5, 1989

[54] HYDRAULIC STAB CONNECTOR, FRICTIONLESS

[76] Inventor: Benton F. Baugh, 14626 Oak Bend, Houston, Tex. 77079

[21] Appl. No.: 167,499

[22] Filed: Mar. 14, 1988

[51] Int. Cl.$^4$ .......................... F16L 1/04; F16L 17/02
[52] U.S. Cl. .................... 405/191; 405/169; 405/188; 405/190; 285/18; 285/101; 285/338; 166/338
[58] Field of Search .............. 405/169, 170, 188, 190, 405/191; 166/344, 347, 338; 285/101, 109, 113, 338, 339, 346, 18

[56] References Cited

U.S. PATENT DOCUMENTS

| | | | |
|---|---|---|---|
| 993,661 | 5/1911 | Dudley | 285/339 |
| 1,822,444 | 9/1931 | MacClatchie | 285/338 X |
| 3,422,864 | 1/1969 | Allinquant | 285/101 X |
| 3,542,076 | 11/1970 | Richardson | 285/338 X |
| 3,768,839 | 10/1973 | Thompson | 285/338 X |
| 4,439,068 | 3/1984 | Pokladnik | 405/169 |
| 4,465,104 | 8/1984 | Wittman et al. | 405/170 X |
| 4,601,608 | 7/1986 | Ahlstone | 405/169 |

Primary Examiner—Randolph A. Reese
Assistant Examiner—John A. Ricci

[57] ABSTRACT

A hydraulic stab sub with multiple seals especially for use in remote and harsh environments with the ability to move the seals radially inward to a retracted position in which the hydraulic stab sub can be easily inserted into a mating receptacle and alternately to move the seals radially outward to perform useful functions such as sealing or locking into the receptacle.

18 Claims, 2 Drawing Sheets

HYDRAULIC STAB CONNECTOR, FRICTIONLESS

FIELD OF THE INVENTION

The present invention relates to an apparatus for use in connecting a fluid conduit carried by a diver or an ROV (Remotely Operated Vehicle) to a fluid conduit or receptacle of a subsea equipment assembly with the seals therebetween in a retracted position while connecting and the seals being extended for sealing after connecting, thereby allowing installation without seal friction and/or providing locking friction after connecting.

BACKGROUND OF THE INVENTION

As offshore drilling and completion operations progress into deeper waters, especially in depths of water greater than 1000 feet, many relatively simple surface operations become complex and costly. One frequent operational requirement is that of engaging a hydraulic stab sub receptacle with a probe for the purpose of applying hydraulic flow and pressure to operate a function. The function can be a valve, blowout preventer, test port, or other such items.

These connections can be made by divers, by ROVs (Remotely Operated Vehicles) which are free swimming, or by manipulators which are guided into place.

These type operations have seen a history of field problems in that the force of insertion is somewhat unpredictable depending on a number of factors such as percent squeeze of the seals, surface finishes, shape of entrance chamfers, hardness of the seal members, cross sectional area of the seal members, and the outer diameter of the seal members.

Industry standards are being developed thru the American Petroleum Institute which should provide a maximum of 30–50 lbs. of insertion force, a number which will not allow the insertion of most stab subs manufactured at the present time.

A further complication to this is that if a significant amount of remote capability is to be gained, more than one stab sub needs to be engaged at an interface to allow multiple control functions. In some cases as many as ten functions are being considered at a time, each of which require hydraulic control thru a stab sub. The potential forces to be required to handle multiple insertions such as these are clearly in excess of the horizontal forces available from free swimming vehicles or divers.

A further complication to the remote stabbing tools is that for many of the subsea systems, a 20 year life expectancy is desired for the tooling. This means that the surface finish of the subsea receptacles can be questionable after prolonged exposure. Even when protectors have been in place for 20 years, the protected surfaces would be suspect.

SUMMARY OF THE INVENTION

The object of the present invention is to provide a hydraulic stab sub means which is capable of being inserted into a recptacle with the seals retracted from a position of interference with the sealing wall and thereby provide a low insertion force requirement by the absence of seal friction.

A further object of this invention is to provide means to radially expand the seal from the retracted position to a position of engagement with and sealing against the wall of the receptacle and thereby provide a pressure tight connection.

A further object of this invention is to provide for more economical receptacle construction by reducing the overall length requirement of the receptacles by eliminating the length needed for entrance chamfers for the seals.

A further object of this invention is to provide for radial expansion of the seal into a grooved area within the receptacle and thereby provide a mechanical locking action between the stab sub and the receptacle.

BRIEF DESCRIPTION OF THE DRAWINGS

FIG. no. 1 is a schematic of a remotely operated vehicle (ROV) positioned adjacent to a subsea equipment assembly.

FIG. no. 2 is a half section of a hydraulic stab sub and receptacle of this invention with the seals retracted from sealing engagement with the bore of the receptacle.

Figure 1:
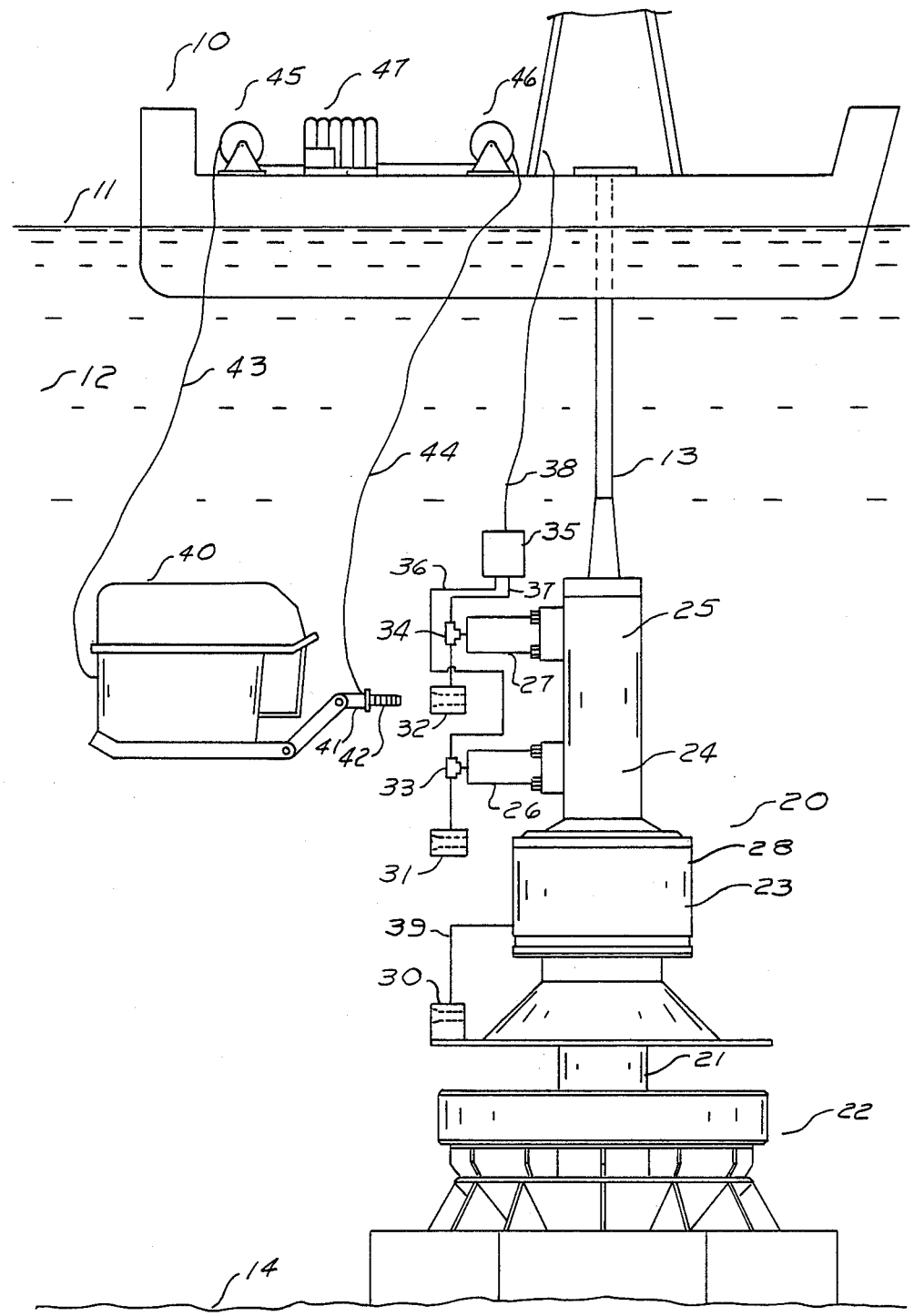
Figure 2:
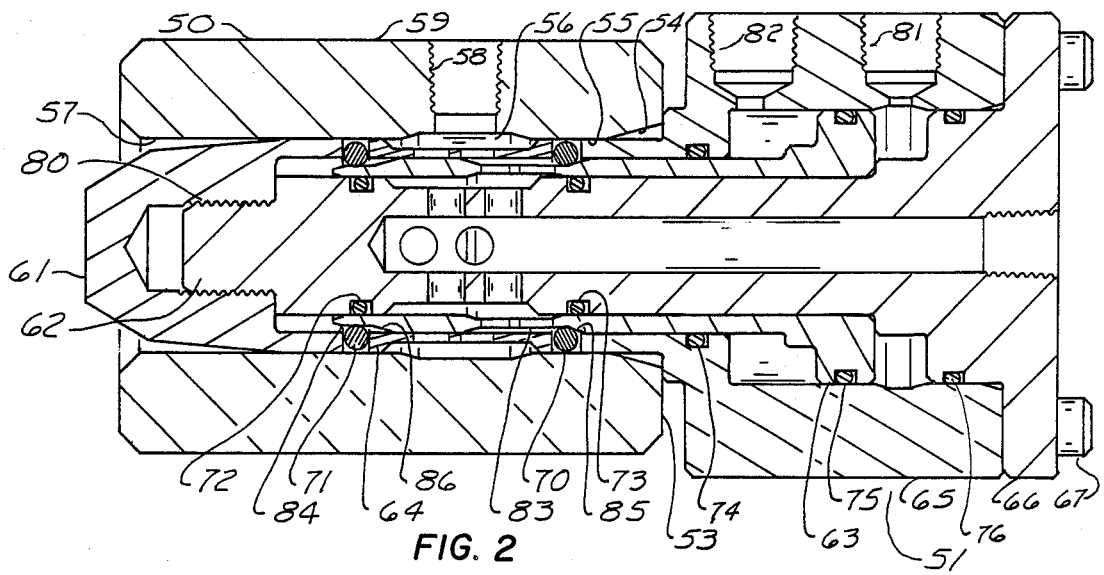
Figure 3:
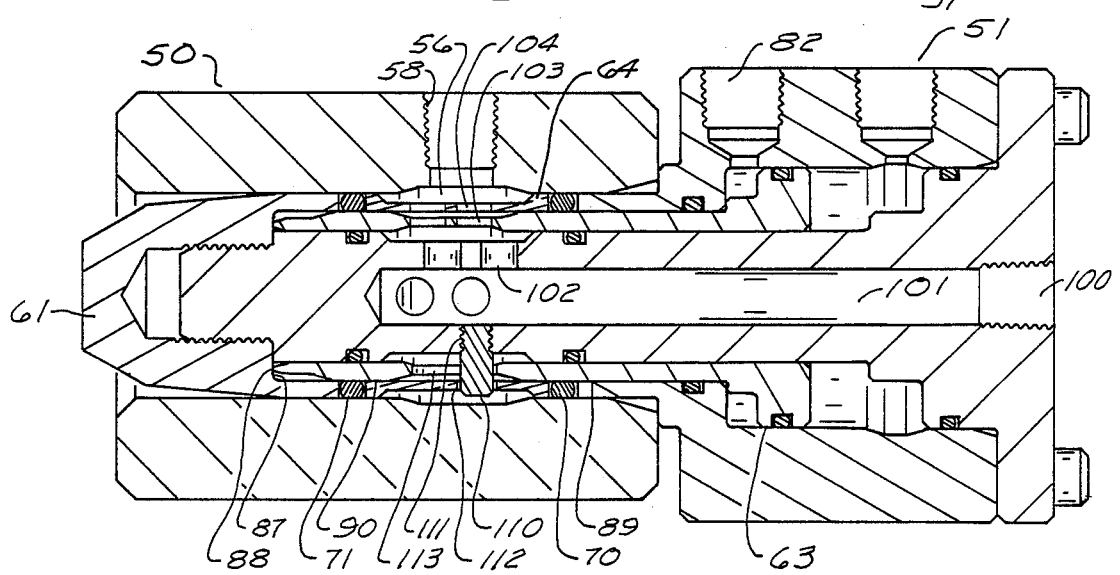

FIG. no. 3 is a half section of a hydraulic stab sub and receptacle of this invention with the seals radially energized against the bore of the receptacle.

FIG. no. 4 is a half section of a hydraulic stab sub engaged in a receptacle which has special grooves cut adjacent to the seals to act as a connector means and shows a method of placing a spring in the operating cylinder to give automatic (failsafe) movement to a preferred position when the hydraulic pressure is removed.

DESCRIPTION OF THE PREFERRED EMBODIMENT

Referring now to FIG. no. 1, a vessel 10 is shown floating upon the surface 11 of the body of water 12. A riser assembly 13 extends downwardly from the vessel 10 towards the bottom 14 of the body of water 12. The lower elements of the riser assembly 13 consist, in this example, of a subsea wellhead assembly 20 typically positioned on or near the bottom 14 of the body of water 12. Extending downwardly into the earth formation for drilling and completion operations is housing assembly 21 which suspends one or more strings of casing and is landed on landing base 22.

It is recognized that the term subsea wellhead assembly is meant to include any assemblage of components either fixedly or removably secured to the top of the housing assembly 21, either during the drilling, completion, production, reworking, or maintenance of a well. Thus, during the drilling of a well, the subsea wellhead assembly may comprise certain components such as blowout preventers, valves, connectors, etc.

The subsea wellhead assembly 20 comprises various components such as a hydraulically operated connector 23 and hydraulically actuated valves 24 and 25 which are actuated by valve actuators 26 and 27 respectively. The operator 28 for the connector 23 is typically made integrally with the connector.

Receptacles 30, 31, and 32 are provided for receiving hydraulic flow and pressure to operate connector 21 and valves 24 and 25 respectively. Receptacles 31 and 32 are connected to valves 24 and 25 thru shuttle valves 33 and 34. Shuttle valves 33 and 34 are further connected to a control means 35 thru hoses 36 and 37. Control means 35 is connected by control hoses 38 to the surface. Normal control of these functions is thru the control means 35 from the surface. When required, secondary or emergency control can be achieved by pressuring thru the receptacles. The shuttle valves 33 and 34 prevent the signal from one shuttle valve port to communicate with the opposite shuttle valve port, as is well known in the industry.

Receptacle 30 is connected to the hydraulically operated connector 23 by hose 39 and is not operated redundantly from the surface. The only means of operating this connector is thru the receptacle.

ROV 40 is shown with a manipulator arm 41, a hydraulic stab sub 42, hose 43 which receives hydraulic and/or electric power from the surface to operate the ROV, and hose 44 which receives hydraulic power from the surface for the hydraulic stab sub 42.

On the vessel 10 at the surface the hose 43 connects to reel 45 and the hose 44 connects to the reel 46. Both reel 45 and reel 46 are shown connected to the hydraulic accumulator skid 47.

The ROV 40 is capable of vertical or horizontal movement and is capable of positioning itself near any of the receptacles 30, 31, or 32 at the comands of the operator at the surface.

Referring now to FIG. no. 2, receptacle 50 is representative of receptacles 30, 31, and 32 in FIG. no. 1 and hydraulic stab sub 51 is representative of the hydraulic stab sub 42 in FIG. no. 1.

Receptacle 50 has a face 53, an entrance chamfer 54, a seal bore 55, a recessed area 56, and second seal bore 57. Bores 55 and 57 are preferably of the same diameter to allow the forces generated by pressure to be balanced. In some cases it may be desirable to make the diameters of a different size, or to taper the bores. Receptacle 50 also has a threaded port 58 extending from the outside 59 of the receptacle 50 to the recessed area 56. The threaded port 58 and the recessed area 56 cooperate to allow fluid communication thru the receptacle 50.

Hydraulic stab sub 51 has a nose 61, body 62, piston 63, spacer ring 64, outer body 65, cap portion of body 66, bolts 67, and seals 70-76. Thread 80 attaches the nose 61 to the body 62. Bolts 67 attach the cap portion of body 66 to the outer body 65. Threaded port 81 can be pressured to move the piston 63 from its present position in a direction which would be to the left on the page of the figure. Threaded port 82 can be pressured to move the piston 63 back to the right to its present position.

As seen on the figure, seals 72-76 are in a typical installation for seals, especially of the self energized type referred to as O-Rings. Seals 70 and 71 are in fact not touching the seal surfaces 55 and 57 which they are adjacent to.

With this arrangement of the seals 70 and 71 which are to seal on the bores 55 and 57 respectively, the hydraulic stab sub 51 can be inserted into the receptacle 50 without any friction, if it is properly aligned. As friction forces are typically calculated as the normal force times the coefficient of friction, the non-contact of the seals yields a zero normal force and therefore no frictional forces.

Piston 63 provides first diameters 83 and 84 which are adjacent to the internal diameter of seals 70 and 71 respectively. The radial distance between from diameters 83 and 84 to seal bores 55 and 57 is greater than the cross sectional diameter of the seals 70 and 71.

When the piston 63 is moved by pressure input into port 81, the piston moves to the left on the page of the figure and chamfers 85 and 86 contact the seals 70 and 71 respectively and start to move them outwardly. In like manner, this movement can be generated by an independent cylinder, rotation of a screw thread, or other devices.

Referring now to FIG. no. 3, when the piston 63 is moved fully to the left until shoulder 88 on piston 63 strikes shoulder 87 on nose 61, second diameters 89 and 90 will be moved behind seals 70 and 71 respectively. As second diameters 89 and 90 are of a larger diameter than first diameters 83 and 84, the radial distance from the diameters 89 and 90 to the seal bores 55 and 57 is reduced, and is in fact reduced to a distance less than the cross section diameter of the seals 70 and 71.

The placement of the seals 70 and 71 into this area which is smaller than their cross section provides compression on the seals to cause them to seal. When the distance from the second diameters 89 and 90 from the seal bores 55 and 57 respectively is manufactured correctly as is well known in the art, reliable sealing of the seals 70 and 71 will result.

At this time hydraulic pressure and/or flow can be input into the threaded port 100, thru the hole 101, thru radial holes 102 in the body 62, thru radial holes 103 in the piston 63, thru radial holes 104 in the spacer ring 64, into the recessed area 56, and out the threaded port 58. In like manner, flow can be taken in the reverse direction.

When the hydraulic flow or pressuring is completed, pressure can be input into the port 82 to move the piston to the right on the page and cause the compression to the seals 70 and 71 to be eliminated.

The figures are illustrating that dual seals are moved against seal bores to provide a flow path for a single hydraulic signal. Three or more seals can be utilized in this method to cause two or more flow paths for multiple signals within a stab sub. To accurately position multiple spacer rings 64 when using 2 or more seals, positioning pins 110 can be used. Positioning pins 110 are threaded into ports 111 in body 62 and engage holes 112 in the spacer ring 64. Other spacer rings can be suspended around the body 62 in a similar manner to accurately locate additional seals.

Piston 63 is required to move from left to right when the positioning pins 110 are in place, so slots such as illustrated at 113 are provided. Slots 113 provide adequate clearance for the positioning pins 110 during the full travel of the piston 63.

As is well known in the art, when seals such as O-Rings are in a conventional groove, difficulty can be had in sliding a hydraulic stab sub into a seal bore. For this reason, it is conventional to machine a gradually sloping entrance chamber such as at 54 to allow the seals to be compressed gradually. The gradually sloping entrance chamfers such as the 15 degree one shown at 54 reduce the insertion forces. Even with these chamfers, the insertion can still require effort, i.e. approximately 30 lbs. on a 1⅜" O.D. standard ⅛" cross section O-Ring. The entrance chamfer 54 and entrance chamfer 115 and removal chamfer 116 can well be eliminated thru the use of the seal means of this invention. In some situations, especially with multiple hydraulic flow paths, this can result in a considerable savings in the length of the receptacle 50.

Figure 4:
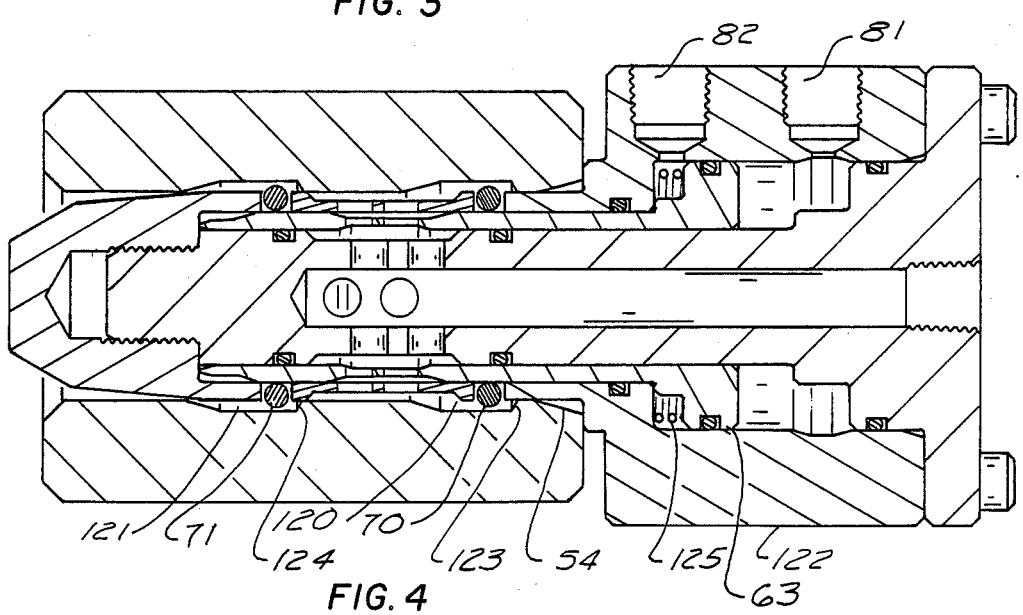

Referring now to FIG. 4, a further use of the radial movement of the seals 70 and 71 can be seen. The combination of the ability to move the seal radially and the difficulty of passing an energized (radially expanded) seal past a steep shoulder provide for a mechanical locking action. When the hydraulic stab sub 42 is inserted into a locking receptacle 120 and the seals 70 and 71 are energized into recesses 121 and 122 behind shoulders 123 and 124, the hydraulic stab sub 42 and the locking receptacle 120 are effectively locked together.

Shoulders 123 and 124 are shown machined at approximately 60 degrees to the centerline of the hydraulic stab sub 42 rather than the 15 degrees of chamfer 54. As is well known in the art, any angle from approximately 45 degrees to 90 degrees for shoulders 123 and 124 will prevent the removal of the seals 70 and 71 without a relatively high force.

The seal rings 70 and 71 which would require a total of 60 lbs. to engage in a receptacle such as 50 with 15 degree chamfers must now be pulled out past a 60 degree shoulders. The force to remove will be approximately 1000 lbs. as the seals 70 and 71 will literally have to be sheared in half. However, when the piston is moved to the right by pressure in port 82, the hydraulic stab sub 122 can be easily and frictionlessly removed. The invention thereby has the capacity to provide a strong connection to the receptacle.

Additionally, the angles of the shoulders 123 and 124 can be machined at differing angles from the full range of 0 to 90 degrees and at differing spacings in order to obtain desired release forces and characteristics.

Spring 125 is shown on the side of the piston 63 normally pressured thru threaded port 82. With a spring such as this, the piston 63 can be moved to the left by pressure in threaded port 81 and will automatically move back to the right when pressure is relieved from threaded port 81. Alternately, the spring 125 can be placed on the opposite side of the piston 63 and have it move automatically in the opposite direction when the pressure is relieved.

The foregoing disclosure and description of this invention are illustrative and explanatory thereof, and various changes in the size, shape, and materials, as well as the details of the illustrated construction may be made without departing from the spirit of the invention.

I claim:

1. In a hydraulic stab assembly for the purpose of sealingly communicating fluid pressure between a stab sub and a receptacle with a bore of a first diameter,
    a stab sub with an outer diameter for insertion into said receptacle, one or more seals, and means which expand radially within the inner diameter of said one or more seals to move said one or more seals radially,
    said one or more seals having a first position with their outer diameters less than said first diameter and having a second position with their outer diameters equal to or greater than said first diameter,
    such that when said one or more seals are in a radially inward position said stab sub can be inserted into or removed from said receptacle without seal contact friction with said receptacle and such that when said one or more seals are in a radially outward position sealing engagement will be caused with said receptacle.

2. In a hydraulic stab assembly for the purpose of sealingly communicating fluid pressure between a stab sub and a receptacle with a bore of a first diameter,
    a stab sub with an outer diameter for insertion into said receptacle, one or more seals, and means to move said one or more seals radially,
    said one or more seals having a first position with their outer diameters less than said first diameter and having a second position with their outer diameters equal to or greater than said first diameter,
    such that when said one or more seals are in a radially inward position said stab sub can be inserted into or removed from said receptacle without seal contact friction with said receptacle and such that when said one or more seals are in a radially outward position sealing engagement will be caused with said receptacle,
    a sleeve member having one or more first smaller diameter portions and one or more second larger diameter portions
    such that when said sleeve member is in a first axial position said one or more first smaller diameter portions are located radially inward of said one or more seals allowing said one or more seals to be in said first position and
    when said sleeve member is in a second axial position said one or more second larger diameter portions are radially inward of said one or more seals causing said one or more seals to be in said second position,
    such that when said sleeve member is in said first axial position said stab sub can be inserted into or removed from said receptacle without seal contact friction with said receptacle and such that when said sleeve member is in said second axial position sealing engagement will be caused between said one or more seals and said receptacle.

3. The invention of claim 2, wherein said stab sub further comprises a body, one or more spacer rings, one or more positioning pins, and one or more slots in said sleeve member such that
    said body is located within said sleeve member,
    said spacer rings separate and locate said one or more seals,
    said positioning pins pass through holes in said spacer rings and pass through slots in said sleeve member, and are attached to said body fixing the position of said spacer rings relative to said body, and
    said slots allows said sleeve member to move axially from said first axial position to said second axial position.

4. The invention of claim 2, further comprising a piston and cylinder means which accepts hydraulic fluid pressure from an external source to move said sleeve member from said first axial position to said second axial position and alternately from said second axial position to said first axial position.

5. The invention of claim 2, further comprising a piston and cylinder means which accepts hydraulic fluid pressure from an external source to move said sleeve member from said first axial position to said second axial position and spring means to move said sleeve member from said second axial position to said first axial position upon removal of said hydraulic fluid pressure.

6. The invention of claim 2, further comprising a piston and cylinder means which accepts hydraulic fluid pressure from an external source to move said sleeve member from said second axial position to said first axial position and spring means to move said sleeve member from said first axial position to said second axial position upon removal of said hydraulic fluid pressure.

7. The invention of claim 2, wherein said one or more seals are of a circular cross sectional area.

8. In a hydraulic stab assembly for the purpose of sealingly communicating fluid pressure between a stab sub and a receptacle with a bore of a first diameter, a stab sub with an outer diameter for insertion into said receptacle, one or more seals, and means which expand radially within the inner diameter of said one or more seals to move said one or more seals radially, said one or more seals having a first position with their outer diameters less than said first diameter and having a second position with their outer diameters greater than said first diameter when not restricted from outward movement by surfaces within said receptacle, such that when said one or more seals are in a radially inward position said stab sub can be inserted into or removed from said receptacle without seal contact friction with said receptacle and such that when said one or more seals are in a radially outward position sealing engagement will be caused with said receptacle.

9. In a hydraulic stab assembly for the purpose of sealingly communicating fluid pressure between a stab sub and a receptacle with a bore of a first diameter, a stab sub with an outer diameter for insertion into said receptacle, one or more seals, and means to move said one or more seals radially, said one or more seals having a first position with their outer diameters less than said first diameter and having a second position with their outer diameters greater than said first diameter when not restricted from outward movement by surfaces within said receptacle, such that when said one or more seals are in a radially inward position said stab sub can be inserted into or removed from said receptacle without seal contact friction with said receptacle and such that when said one or more seals are in a radially outward position sealing engagement will be caused with said receptacle, one or more recesses of a diameter greater than said first diameter which are positioned adjacent to said one or more seals when said stab sub is inserted into said receptacle, and such that when said one or more seals are in said second position said seals will be moved to a position partially within said one or more recesses and provide an interference with a shoulder in said one or more recesses when removal of said stab sub from said receptacle is attempted.

10. The invention in claim 9, wherein said shoulders in said one or more recesses which interfere when the removal of said stab sub from said receptacle is attempted can be machined at varying angles to regulate the relative difficulty in removing said stab sub from said receptacle.

11. In a hydraulic stab assembly for the purpose of sealingly communicating fluid pressure between a stab sub and a receptacle with a bore of a first diameter, a stab sub with an outer diameter for insertion into said receptacle, one or more seals, and means to move said one or more seals radially, said seals having a first position with their outer diameters less than said first diameter and having a second position with their outer diameters greater than said first diameter when not restricted from outward movement by surfaces within said receptacle, such that when said one or more seals are in a radially inward position said stab sub can be inserted into or removed from said receptacle without seal contact friction with said receptacle and such that when said one or more seals are in a radially outward position sealing engagement will be caused with said receptacle, a sleeve member having one or more first smaller diameter portions and one or more second larger diameter portions such that when said sleeve member is in a first axial position said one or more first smaller diameter portions are located radially inward of said one or more seals allowing said one or more seals to be in said first position and when said sleeve member is in a second axial position said one or more second larger diameter portions are radially inward of said one or more seals causing said one or more seals to be in said second position, such that when said sleeve member is in said first axial position said stab sub can be inserted into or removed from said receptacle without seal contact friction with said receptacle and such that when said sleeve member is in said second axial position sealing engagement will be caused between said one or more seals and said receptacle.

12. The invention of claim 11, wherein said stab sub further comprises a body, one or more spacer rings, one or more positioning pins, and one or more slots in said sleeve member such that said body is located within said sleeve member, said spacer rings separate and locate said one or more seals, said positioning pins pass through holes in said spacer rings and pass through slots in said sleeve member, and are attached to said body fixing the position of said spacer rings relative to said body, and said slots allows said sleeve member to move axially from said first axial position to said second axial position.

13. The invention of claim 11, further comprising a piston and cylinder means which accepts hydraulic fluid pressure from an external source to move said sleeve member from said first axial position to said second axial position and alternately from said second axial position to said first axial position.

14. The invention of claim 11, further comprising a piston and cylinder means which accepts hydraulic fluid pressure from an external source to move said sleeve member from said first axial position to said second axial position and spring means to move said sleeve member from said second axial position to said first axial position upon removal of said hydraulic fluid pressure.

15. The invention of claim 11, further comprising a piston and cylinder means which accepts hydraulic fluid pressure from an external source to move said sleeve member from said second axial position to said first axial position and spring means to move said sleeve member from said first axial position to said second axial position upon removal of said hydraulic fluid pressure.

16. The invention of claim 11, wherein said one or more seals are of a circular cross sectional area.

17. In a hydraulic stab assembly for the purpose of sealingly communicating fluid pressure between a stab sub and a receptacle with a bore of a first diameter, a stab sub with an outer diameter for insertion into said receptacle, one or more seals, and means to move said one or more seals radially, said seals having a first position with their outer diameters less than said first diameter and having a second position with their outer diameters equal to or greater than said first diameter, such that when said one or more seals are in a radially inward position said stab sub can be inserted into or removed from said receptacle without seal contact friction with said receptacle and such that when said one or more seals are in a radially outward position sealing engagement will be caused with said receptacle, said stab sub further comprising a sleeve member having one or more first smaller diameter portions and one or more second larger diameter portions, such that when said sleeve member is in a first axial position said one or more first smaller diameter portions are located radially inward of said one or more seals allowing said one or more seals to be in said first position and when said sleeve member is in a second axial position said one or more second larger diameter portions are radially inward of said one or more seals causing said one or more seals to be in said second position, said stab sub further comprising a body, one or more spacer rings, one or more positioning pins, and one or more slots in said sleeve member such that said body is located within said sleeve member, said spacer rings separate and locate said one or more seals, said positioning pins pass through holes in said spacer rings and pass through slots in said sleeve member, and are attached to said body fixing the position of said spacer rings relative to said body, and said slots allows said sleeve member to move axially from said first axial position to said second axial position, said stab sub further comprising a piston and cylinder means which accepts hydraulic fluid pressure from an external source to move said sleeve member from said first axial position to said second axial position and alternately from said second axial position to said first axial position.

18. The invention of claim 17, wherein said one or more seals are of a circular cross sectional area.

* * * * *